(12) United States Patent
Castelli et al.

(10) Patent No.: US 9,471,559 B2
(45) Date of Patent: Oct. 18, 2016

(54) DEEP ANALYSIS OF NATURAL LANGUAGE QUESTIONS FOR QUESTION ANSWERING SYSTEM

(71) Applicant: International Business Machines Corporation, Armonk, NY (US)

(72) Inventors: Vittorio Castelli, Croton-on-Hudson, NY (US); Radu Florian, Danbury, CT (US); Xiaoqiang Luo, Ardsley, NY (US); Sameer Maskey, New York, NY (US); Hema Raghavan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/835,924

(22) Filed: Mar. 15, 2013

(65) Prior Publication Data

US 2014/0163962 A1  Jun. 12, 2014

Related U.S. Application Data

(60) Provisional application No. 61/735,286, filed on Dec. 10, 2012.

(51) Int. Cl.
*G06F 17/27* (2006.01)
*G06F 17/30* (2006.01)

(52) U.S. Cl.
CPC .......... *G06F 17/271* (2013.01); *G06F 17/278* (2013.01); *G06F 17/2715* (2013.01); *G06F 17/30707* (2013.01); *G06F 17/30976* (2013.01); *G06F 17/2785* (2013.01)

(58) Field of Classification Search
CPC .... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ................................................. 704/1, 9, 10
See application file for complete search history.

(56) References Cited

U.S. PATENT DOCUMENTS 5,980,096 A * 11/1999 Thalhammer-Reyero
6,816,858 B1 * 11/2004 Coden et al. ................. 707/750
(Continued)

FOREIGN PATENT DOCUMENTS

WO 9825217 A1 6/1998

OTHER PUBLICATIONS

Zhou et al., Tree Kernal-based Relation Extraction with Context-Sensitive Structured Parse Tree Information, 2007, Association for Computational Linguistics, Proceedings of the 2007 Joint Conference on Empirical Methods in Natural Language Processing and Computational Natural Langauge Learning, pp. 728-736.*
(Continued)

*Primary Examiner* — Lamont Spooner
(74) *Attorney, Agent, or Firm* — Scully, Scott, Murphy & Presser, P.C.; Daniel P. Morris, Esq.

(57) ABSTRACT

Creating training data for a natural language processing system may comprise obtaining natural language input, the natural language input annotated with one or more important phrases; and generating training instances comprising a syntactic parse tree of nodes representing elements of the natural language input augmented with the annotated important phrases. In another aspect, a classifier may be trained based on the generated training instances. The classifier may be used to predict one or more potential important phrases in a query.

18 Claims, 5 Drawing Sheets

(56) References Cited

U.S. PATENT DOCUMENTS

| | | | | |
|---|---|---|---|---|
| 7,013,323 | B1* | 3/2006 | Thomas et al. | 709/203 |
| 7,526,425 | B2* | 4/2009 | Marchisio et al. | 704/9 |
| 7,610,191 | B2* | 10/2009 | Gao et al. | 704/9 |
| 8,140,323 | B2* | 3/2012 | Johnson et al. | 704/9 |
| 8,275,803 | B2 | 9/2012 | Brown et al. | |
| 8,645,125 | B2* | 2/2014 | Liang et al. | 704/9 |
| 8,700,604 | B2* | 4/2014 | Roseman et al. | 707/716 |
| 8,706,491 | B2* | 4/2014 | Chelba et al. | 704/257 |
| 2003/0176999 | A1* | 9/2003 | Calcagno et al. | 704/9 |
| 2003/0212543 | A1* | 11/2003 | Epstein et al. | 704/9 |
| 2004/0148275 | A1* | 7/2004 | Achlioptas | G06F 17/30867 |
| 2005/0027512 | A1* | 2/2005 | Waise | 704/9 |
| 2005/0108001 | A1* | 5/2005 | Aarskog | 704/10 |
| 2006/0074634 | A1* | 4/2006 | Gao et al. | 704/9 |
| 2006/0116994 | A1* | 6/2006 | Jonker et al. | 707/3 |
| 2007/0027671 | A1* | 2/2007 | Kanawa | 704/4 |
| 2008/0294978 | A1* | 11/2008 | Klintsov et al. | 715/234 |
| 2010/0017427 | A1* | 1/2010 | Johnson et al. | 707/102 |
| 2010/0023319 | A1* | 1/2010 | Bikel et al. | 704/9 |
| 2010/0076972 | A1* | 3/2010 | Baron et al. | 707/736 |
| 2010/0114899 | A1* | 5/2010 | Guha et al. | 707/741 |
| 2011/0055233 | A1* | 3/2011 | Weber | G06F 17/30625 707/752 |
| 2011/0282892 | A1* | 11/2011 | Castellani et al. | 707/766 |
| 2012/0011428 | A1* | 1/2012 | Chisholm | 715/230 |
| 2012/0109640 | A1 | 5/2012 | Anisimovich et al. | |
| 2012/0117475 | A1* | 5/2012 | Lee et al. | 715/733 |
| 2012/0158687 | A1* | 6/2012 | Fang et al. | 707/706 |
| 2012/0173224 | A1 | 7/2012 | Anisimovich et al. | |
| 2012/0197862 | A1* | 8/2012 | Woytowitz et al. | 707/710 |

OTHER PUBLICATIONS

Nguyen et al., Convolution Kernals on Constituent, Dependency and Sequential Structures for Relation Extraction, 2009, Proceedings of the 2009 Conference on Empirical Methods in Natural Language Processing: vol. 3. Association for Computational Linguistics, pp. 1378-1387.*

Wang, K. et al.; "A Syntactic Tree Matching Approach to Finding Similar Questions in Community-based QA Services"; SIGIR'09 Conference, Boston, MA.; Jul. 19-23, 2009.

Elworthy, D.; "Question Answering Using a Large NLP System"; Microsoft Research Limited, Cambridge, UK., 2002.

Anonymous; "Method of Computing Relevancy Score in a Question and Answering System"; http://priorartdatabase.com/IPCOM/000222407; Oct. 2, 2012.

Woods, WA. et al.; "Research in Natural Language Understanding (Report No. 6)"; http://www.ip.com/pubview/IPCOM000128808D; Sep. 19, 2005.

* cited by examiner

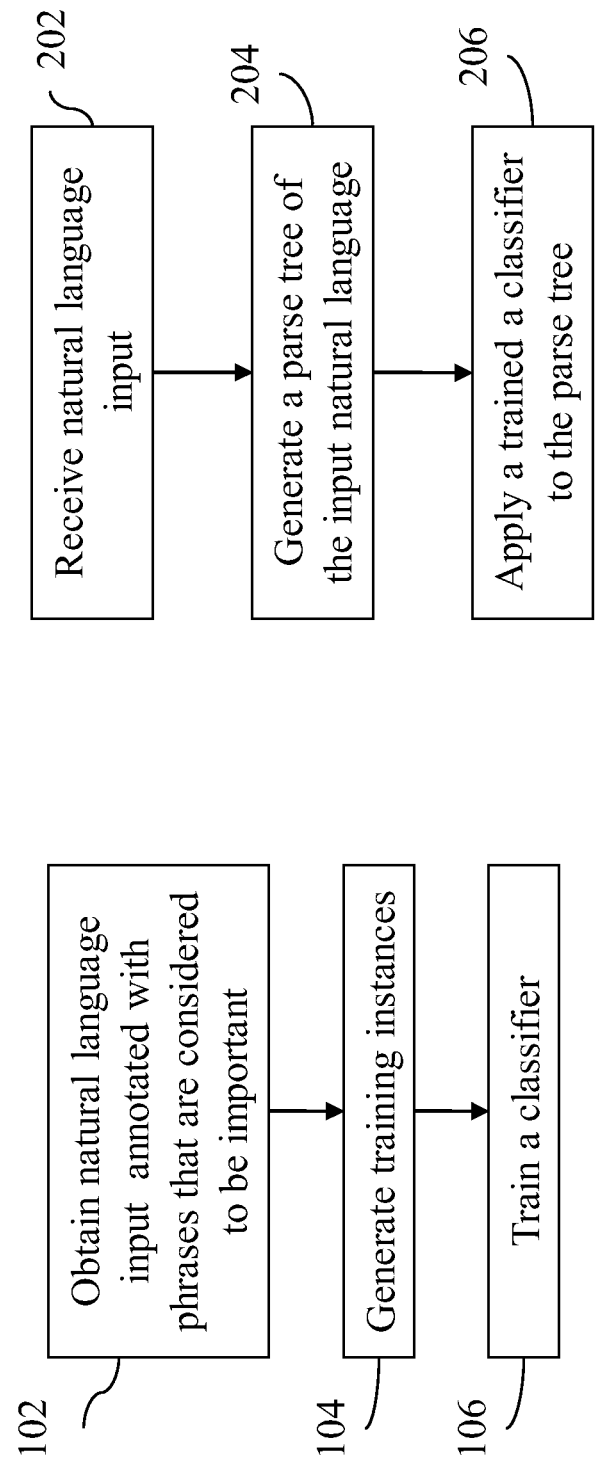

DEEP ANALYSIS OF NATURAL LANGUAGE QUESTIONS FOR QUESTION ANSWERING SYSTEM

CROSS-REFERENCE TO RELATED APPLICATIONS

This application claims the benefit of U.S. Provisional Application No. 61/735,286, filed on Dec. 10, 2012, which is incorporated herein by reference in its entirety.

STATEMENT REGARDING FEDERALLY SPONSORED RESEARCH OR DEVELOPMENT

This invention was made with Government support under Contract No.: HR0011-12-C-0015 awarded by Defense Advanced Research Projects Agency (DARPA). The Government has certain rights in this invention.

FIELD

The present application relates generally to computers and computer applications, and more particularly to natural language processing and analyzing natural language input.

BACKGROUND

Some phrases appearing in questions submitted to free-form natural language question-answering systems are necessary for finding relevant answers, while other parts are less important. For example, certain phrases in the questions are very likely to occur in their answers. Identifying automatically the important parts of a question is often difficult; yet, it is needed for building a successful system.

Current solutions rely on bag-of-words models and corpus statistics, such as inverse-document-frequency (IDF), to assign weights to terms in questions. For instance, in most question answering (QA) systems and search engines term-weights are assigned in a context independent fashion using simple Term Frequency-Inverse Document Frequency (TF-IDF)-like models. Even the more recent advances in information retrieval techniques for query term weighting typically rely on bag-of-words models and corpus statistics, such as inverse-document-frequency (IDF), to assign weights to terms in questions.

Consider, for example, the query "How does one apply for a New York day care license?" A bag-of-words model would likely assign a high score to "New licenses for day care centers in York county, PA" because of high word overlap, but it does not answer the question, and also the region (State) is wrong.

Important phrases also are not necessarily contiguous. For example, in the question "how does one change his or her name?" the important part is the predicate-argument structure "change name." A system relying on contiguous n-grams (groups of n contiguous words) and IDFs will return many irrelevant results because "change" and "name" are high-frequency words.

BRIEF SUMMARY

A method for creating training data for a natural language processing system, in one aspect, may comprise obtaining natural language input, the natural language input annotated with one or more important phrases. The method may also comprise generating training instances comprising a syntactic parse tree of nodes representing elements of the natural language input augmented with the annotated important phrases.

In another aspect, a method for natural language processing may comprise receiving a natural language query. The method may also comprise creating a query syntactic tree for the query. The method may further comprise using a trained model comprising a model syntactic tree to predict if a node in the query syntactic tree is important.

A system for creating training data for a natural language processing system, in one aspect, may comprise a training module operable to execute on the processor and further operable to obtain natural language input, the natural language input annotated with one or more important phrases. The training module may be further operable to generate training instances comprising a syntactic parse tree of nodes representing elements of the natural language input augmented with the annotated important phrases. A classifier may be built based on the training instances with plurality of features computed for the training instances.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 1 is a flow diagram illustrating a method of creating a training data set in one embodiment of the present disclosure.

FIG. 2 is a flow diagram illustrating a method of predicting an important phrase in natural language query in one embodiment of the present disclosure.

DETAILED DESCRIPTION

Figure 3:
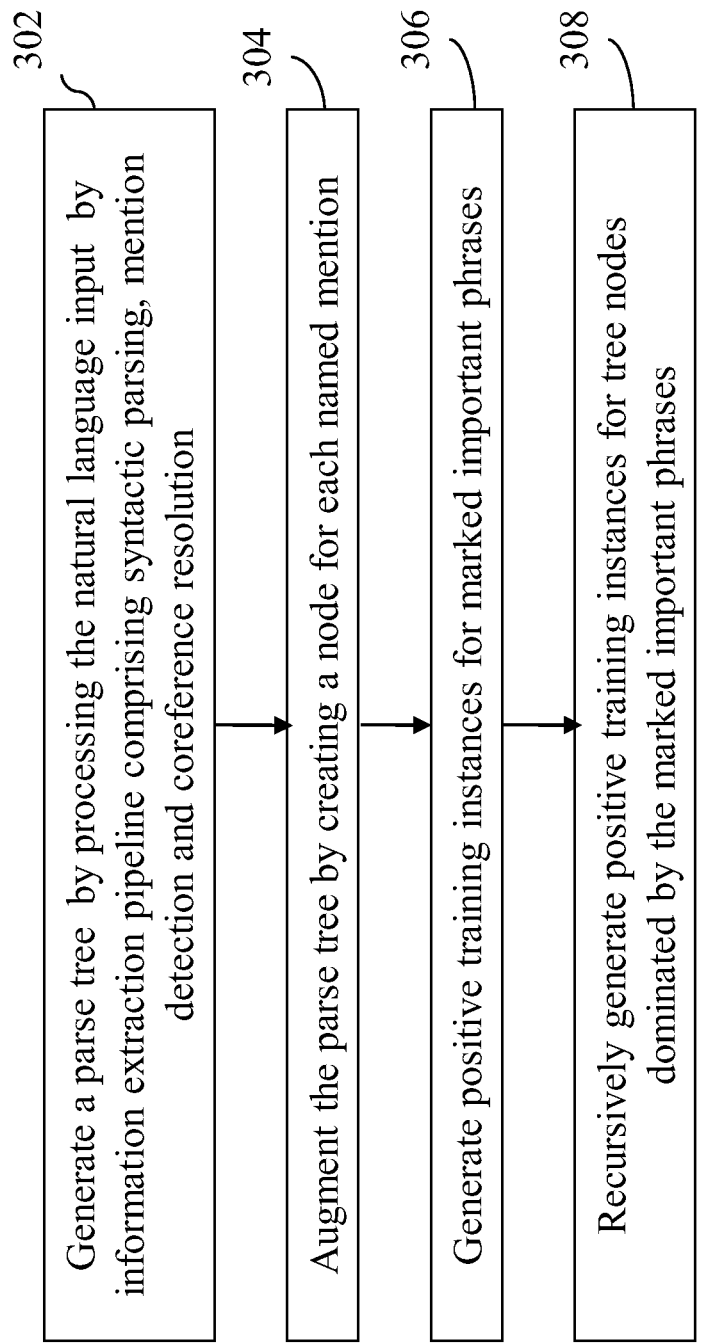
FIG. 3 is a flow diagram illustrating the algorithm for generating MMP training instances in one embodiment of the present disclosure.

The following technical terms are explained below for clarity. Unless otherwise stated particularly, the terms are used as a person of ordinary skill in this technology would interpret them. Search algorithms are algorithms used by search engines, such as those used to perform internet searches. Search algorithms rely on bag-of-words approaches, that transform the text provided by the user as input to the search (henceforth referred to as query) into a collection of words to be matched in the searched documents without regard to the order in which they appear in the query. Search engines also use other approaches in conjunction with bag-of-words approaches. Search engines return documents that are relevant to the query.

A question answering system is a system that takes a user query formulated as a question and returns specific answers—this is in contrast with search engines, which return documents that are relevant to the question, but that do not necessarily contain an answer. Question answering systems typically provide one or more passages retrieved from documents that contain or support the answer. When the passages are short, they are often referred as snippets.

Machine learning studies how to construct algorithms and systems that predict a quantity (label) from observed examples for a specific problem and domain, using data illustrative of the same problem for the same domain. Labels can be categorical, that is, they can belong to a finite or countable set, or numeric, for example, a score. Probabilistic classifiers can also associate a probability value with the predicted label, denoting the confidence in the prediction, or produce a probability value for each of the possible labels.

Machine learning studies learning algorithms—algorithms that take as input collections of digital representations of examples and their labels and produce a function that predict labels from digital representations of examples. A pair comprising an observation with its label is called a training example, a training sample, or a training instance, and a collection of training examples is called a training set. In natural language processing, training sets for specific problems are typically produced manually by humans (annotators), who inspect and label (annotate) collections of text passages or documents.

A digital representation of an observation is automatically computed by an appropriate program, algorithm, or module called a feature extractor and the typical output of a feature extractor is called a feature vector, which is a list or vector of numerical or categorical quantities called features. A feature extractor need not produce a value for every feature given a specific example as input. In natural language processing, it is common for a feature vector extractor to potentially produce a huge number of features, and at the same time to produce a small number of features from each specific example. When a feature extractor produces a value for a specific feature, that feature is said to fire, e.g., "the feature fires."

Given a collection of feature vectors with their labels, a learning algorithm selects a function that predicts the label given the feature vector. This selection process comprises defining a priori a (possibly infinite) set of prediction functions (classifiers), choosing an objective function that computes how well a specific prediction function fits the training set, choosing a strategy to search the set of prediction function (an optimization algorithm) and applying the optimization algorithm to the data to select a prediction function. The selected prediction function is called a classifier or a trained classifier to denote the process that produced the classifier.

Applying a trained classifier to a new example comprises of providing the example to the feature extractor and using the output of the feature extractor as input to the classifier.

In natural language processing, a parse tree provides a representation of the syntactic structure of a sentence. A parse tree is a tree that has a root node representing the entire sentence. Each of the children of the root node represents (covers or spans) a different portion of the sentence.

Every word in the sentence is spanned by a single child of the root. Children of the root are further split into one or more node, until each word and each punctuation mark is spanned by a single node. Nodes in the parse tree represent pieces of the sentence that have specific syntactic roles. These are called constituents, and have specific labels in different taxonomies: according to the Penn Treebank convention, a node covering a noun phrase has label NP. Nodes without children are called terminal nodes while the remaining are called non-terminal nodes. The part of the sentence covered by a specific node and any piece of the part of the sentence is dominated by the node. By convention, the root of a tree has depth 0, its children have depth 1, and so on. Parse trees are typically depicted using an inverted representation, with the root at the top. Thus, the children of a node are lower than their parent node in the tree.

Mention detection refers to a task in natural language processing, which comprises of automatically identifying words or groups of words that refer to a real-world physical, legal, or metaphysical entity. The span of text that refers to an entity is called an entity mention. The process of partitioning entity mentions into groups each of which represents a specific real-world entity is called coreference resolution.

In natural language question answering systems, questions often contain terms and phrases that are important or relevant for retrieving or finding answers from documents. In the present disclosure in one embodiment, a learnable system and a methodology are presented that can extract and rank these terms and phrases (referred to also as "mandatory matching phrases" (MMPs)). In one aspect, the system and the methodology may rely on deep syntactic and semantic analysis of questions only and is independent of relevant documents. The system and a methodology thereof may be utilized in a question and answering system, and to improve the accuracy of the results provided by such question and answering system.

Referring to the example question, "How does one apply for a New York day care license?" a matching algorithm—embodied in a component of the question answering system—that uses the phrases "New York," "day care," and "license" is likely to do better than a bag-of-words model. Still better matching component will understand that in the context of this query all three phrases "New York," "day care" and "license" are important, and that "New York" needs to modify "day care." A snippet that does not contain these important phrases, is unlikely an answer. "Contain" here refers to semantic equivalence or entailment, not necessarily the exact words or phrases. Mandatory matching phrases (MMPs) are also referred to as important phrases in the present disclosure.

The system and a methodology thereof in one embodiment utilize deep syntactic and semantic analysis of questions to determine and rank MMPs (important phrases in the questions). Briefly, while the present disclosure refers to "questions," the system and the methodology herein may apply to other input data such as natural language sentences. Questions may be annotated and a trainable system built to select and score MMPs. While the system and the methodology disclosed herein in one embodiment may utilize syntactic parsers and semantic-oriented named-entity recognizers, they may only need a question, and not the corresponding answers. This may be especially attractive at the initial system-building stage or bootstrapping the training set, when no or little answer data is available. Thus, the approach of the present disclosure in one embodiment may enjoy the benefit of being independent of relevant documents or passages associated with a question.

An aspect of the present disclosure may include creating training data. The training data set incorporates lexical syntactic and semantic information, and can be used to train a model for MMP prediction. The features derived from the training data set may also be used to train an answer-relevance classification model and might improve its performance. The improved relevance model may be used in a question-answering system. Predicting the importance of phrases from the question, e.g., those derived from a parse tree of the question, may provide for a rich representation of the question that might also be useful for better question understanding, and thus generate more relevant answers in a question answering system that uses this information than in an analogous question answering system that does not use this information.

FIG. 1 is a flow diagram illustrating a method of creating a training data set in one embodiment of the present disclosure. At 102, natural language input is obtained that is annotated with phrases that are considered to be important, also referred to as important phrases. Phrases may comprise one or more words. For instance, questions and/or sentences may be obtained which have been annotated.

The following description provides an example of obtaining natural language input and annotations in one embodiment of the present disclosure. A set of questions (natural language input) may be created from a group of existing documents. As one example, a corpus containing forum postings in English may be used as a document collection from which to explore for questions. For instance, keyword searches may be performed and forum threads retrieved from which questions may be generated. Annotators (e.g., human annotators), for example, generate questions that have answers in the retrieved documents. Then other annotators, who have neither browsed the corpus nor generated the questions, mark selected spans (e.g., contiguous words or parts) of the questions into one of two categories—"MMP-Must" and "MMP-maybe." In one embodiment of the present disclosure, an annotation tool (e.g., a user interface or the like) may be provided for enabling an annotator to select parts of a question. An annotation tool allows arbitrary spans of text to be highlighted, and the annotators may be instructed to select spans corresponding to the smallest semantic units. The phrases that are very likely to appear contiguously in a relevant answer are marked as MMP-Must. In one embodiment of the present disclosure, multiple spans per question are allowed, but no overlapping spans can be marked.

Figure 4:
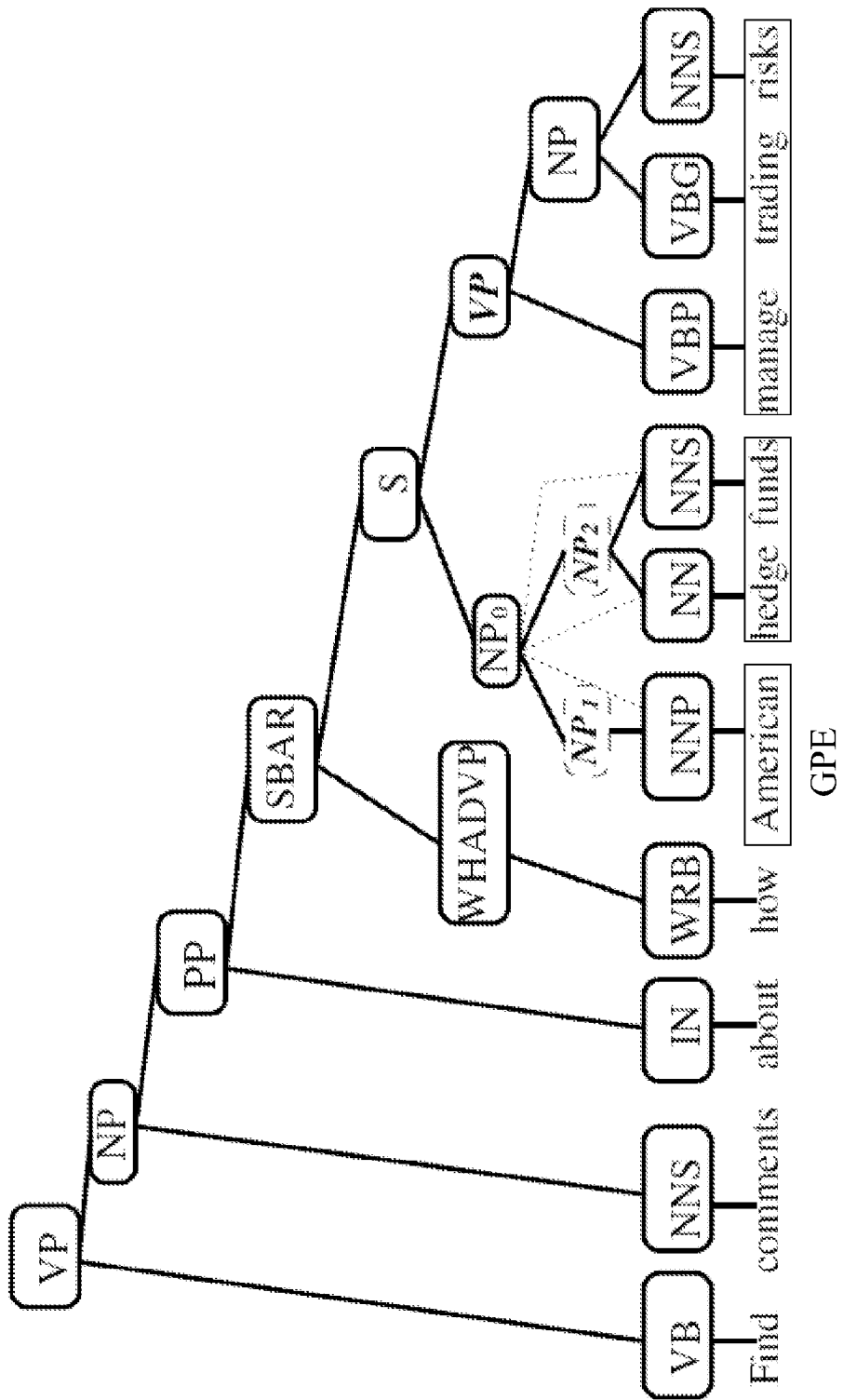
FIG. 4 illustrates an example syntactic parse tree in one embodiment of the present disclosure.

FIG. 4 illustrates an example, where "American," "hedge fund," and "manage trading risks" are three required elements to find answers and are thus marked as MMP-Musts—which are represented in enclosing rectangles. In one embodiment, MMPs are annotated at the word level and not in the parse tree, since this requires minimal linguistic knowledge. An automatic procedure may be employed to attach MMPs to parse tree nodes when generating MMP training instances.

At 104, training instances or data are created. Training instances may include a representation comprising a parse tree of nodes. For example, a question (the natural language input) may be processed by an information extraction (IE) pipeline comprising syntactic parsing, mention detection and coreference resolution. Such processing generates a syntactic structure represented by a parse tree and semantic information represented by coreferenced mentions (including those of named entities), making available the syntactic and semantic information about the question. Briefly, mentions in natural language processing are words that refer to the same object or entity. The IE output and the annotated important phrases are combined. For example, the annotated important phrases are attached to parse tree nodes of the question to augment the parse tree.

In one aspect, marked MMPs might not perfectly be aligned with a tree node. Hence, care is taken when generating MMP training instances. As an example, in FIG. 4, "American" and "hedge funds" are marked as two separate MMPs, but the Penn-Tree-style parse tree has a flat "NP0" constituent spanning directly on "American hedge fund," illustrated in FIG. 4 as dotted edges. To anchor MMPs in the parse tree, the parse tree is augmented by combining the IE output and the MMP annotation. In the aforementioned example, "American" is a named mention with the entity type GPE (geo-political entity) and there is no non-terminal node spanning it: so, a new node "NP1" is created; "hedge funds" is marked as an MMP: so, a second node ("NP2") is created to anchor it.

A training instance for building the MMP model is defined as a span along with an MMP label. For instance, "hedge funds" in FIG. 4 will generate a positive training instance as <(5,6), +1>, where (5, 6) is the span of "hedge funds" in the question sentence, and +1 signifies that it is a positive training instance. Not important phrases or non-MMPs may be generated as negative training instance, e.g., with a label of −1.

The following procedure is an example pseudo-algorithm that generates MMP training instances in one embodiment of the present disclosure.

---
Input: An input question tree with detected mentions and marked MMPs
Output: A list of MMP training instances
 1: Foreach mention m in the question {
 2:   if no node spans m , and m does not cross brackets
 3:     Find the lowest node N dominating m
 4:     Insert a child node of N that spans exactly m }
 5: Foreach mention p in marked MMPs {
 6:   Find the lowest non-terminal node $N_p$ dominating p
 7:   Generate a positive training example for $N_p$
 8:   Mark $N_p$ as visited
 9:   Recursively generate training instances for children of $N_p$
10:   Generate a negative training instance for all unvisited nodes in Step 5-9 }
---

FIG. 3 is a flow diagram illustrating the algorithm for generating MMP training instances in one embodiment of the present disclosure. At 302, a parse tree may be generated by processing the natural language input by information extraction pipeline comprising syntactic parsing, mention detection and coreference resolution. At 304, the parse tree (of the input natural language such as a question) may be augmented by creating a node for each named mention. A node for each named mention is created if no existing nodes spans exactly the mention and the mention does not cross tree constituents. For example, in FIG. 4, "American" is a geo-political entity (GPE) no non-terminal node spans it exactly. So an extra NP-node (identified as NP1 in FIG. 4), is created. The newly-created nodes, such as NP1 and NP2, are shown by dashed-boxes in FIG. 4. At 306, positive training instances are generated for marked MMPs. At 308, positive training instances are recursively generated for tree nodes dominated by the marked MMPs. For example, if "American Hedge Funds" were marked as MMPs, a positive training instance is generated for the NP spanning it (i.e., NP0 in FIG. 4), and one positive instance will be generated for NP1 and one for NP2. If a node spans a single stop word, then a negative training instance is generated. A "stop word" in natural language processing refers to a word filtered out from processing.

Referring back to FIG. 1, at 106, a classifier is trained. After MMP training instances are generated, e.g., by traversing a parse tree as discussed above, features may be computed and/or scored for each instance, and used to train a classifier. A classifier may be a statiscal classifier such as a logistic regression binary classifier. In one embodiment of the present disclosure, four types of features may be computed that will be used in a statistical classifier. These features characterize a phrase from the lexical, syntactic, semantic and corpus-level aspects. The weights associated with these features are automatically learned from training data with appropriate machine learning methods by maximizing the log likelihood of the training data. In the following description, "(NP1 American)" in FIG. 4 is used as the running example.

Lexical Features

Spellings in English sometimes offer important cues about word significance. For example, an all-capitalized word often signifies an acronym; an all-digit word in a question is likely a year, etc. An embodiment of the present disclosure may compute the following lexical features for a candidate MMP:

CaseFeatures: is the first word of an MMP upper-case? Is it all capital letters? Does it contain numeric letters? For "(NP American)" in FIG. 4, the upper-case feature fires, suggesting that "American" is a proper name.

CommonQWord: Does the MMP contain a predefined question words, including "What," "When," "Who," etc.

Syntactic Features

The second group of features are computed from syntactic parse trees after annotated MMPs are aligned with question parse-trees, in one embodiment of the present disclosure.

PhraseLabel: this feature returns the phrasal label of the MMP. For "(NP American)" in FIG. 4, the feature value is "NP." This captures the fact that an NP will be more likely an MMP than, e.g., an ADVP.

NPUnique: this Boolean feature fires if a phrase is the only NP in a question, indicating that this constituent probably should be matched. For "(NP American)," the feature value would be false.

PosOfPTN: these features characterize the position of the parse tree node to which an MMP is anchored to. They capture the position of the left-most word of the node; whether the left-most word is the beginning of the question sentence; and the depth of the anchor node, defined as length of the path to the root node. For "(NP American)" in FIG. 4, the features state that it is the 5th word in the sentence; it is not the first word of the sentence; and the depth of the node (i.e., NP1 in FIG. 4) is 6 (the depth of the root node is 0).

PhrLenToQLenRatio: This feature computes the number of words in an MMP, and its relative ratio to the sentence length. This feature controls the length of MMPs at decoding time, since in one embodiment most of MMPs are short.

Semantic Features (NETypes)

The third group of features are computed from named entities and capture semantic information. The feature tests if a phrase is or contains a named entity, and, if this is the case, the value is the entity type. For "(NP American)" in FIG. 4, the feature value would be "GPE."

Corpus-Based Features

The fourth group of features are computed from corpus statistics, including, e.g.:

AvgCorpusIDF: this feature computes the average of the IDFs of the words in this phrase. From the corpus IDF, another feature may be computed, which is the ratio between the number of stop words in this MMP and the total number of words in the same MMP. Briefly, IDF provides numerical statistics on how important a word is to this phrase.

In this disclosure, $s=w_1^n$ is used to denote a snippet with words $w_1, w_2, \ldots, w_n$, and m to denote a phrase from the MMP model along with a score M(m). Exemplary features computed from snippet s using the phrase computed by MMP model from the question along with the corresponding score are listed below:

HardMatch: Let $I(m \in s)$ be a 1 or 0 function indicating if a snippet contains the MMP m, then the HardMatch score is computed as:

$$HM(q,s) = \frac{\sum_{m \in q} M(m) I(m \in s)}{\sum_{m \in q} M(m)}. \qquad (1)$$

SoftLMMatch: The SoftLMMatch score is a language-model (LM) based score, with the MMPs playing the role of concepts. The snippet-side language model score LM (v|s) is computed as:

$$LM(v|s) = \frac{\sum_{i=1}^{n} I(w_i = v) + 0.05}{n + 0.05|V|} \qquad (2)$$

where $w_i$ is the $i^{th}$ in snippet s; $I(w_i=v)$ is an indicator function, taking value 1 if $w_i$ is v and 0 otherwise; |V| is the vocabulary size.

Using the snippet-size language model score, the SoftLMMatch score between a question q and a snippet s is defined to be:

$$SM(q,s) = \frac{\sum_{m \in q}\left(M(m)\prod_{w \in m} LM(w|s)\right)}{\sum_{m \in q} M(m)}, \qquad (3)$$

where $m \in q$ is a shorthand denoting all MMPs in question q, and similarly, $w \in m$ signifying words in m.

MMPInclusionScore: For any given word w, define its similarity.

An MMP m's inclusion score is:

$$IS(m,s) = \frac{\sum_{w \in m} I(l(w,s) > \delta) IDF(w)}{\sum_{w \in m} IDF(w)}, \qquad (4)$$

where $w \in m$ is the shorthand for all words in m; I(•) is the indicator function taking value 1 when the argument is true and 0 otherwise; δ is a constant threshold; IDF(w) is the IDF of word w. l(w,s) to the similarity of word w to the snippet s as:

$$l(w,s) = \max_{v \in s} JW(w,v), \qquad (5)$$

where JW(w,v) is a similarity score between words w and v, such as the Jaro Winkler similarity score.

The MMPInclusionScore between the question q and snippet s is computed as:

$$IS(q,s) = \frac{\sum_{m \in q} M(m) IS(m,s)}{\sum_{m \in q} M(m)} \qquad (6)$$

MMPRankDep: This feature, denoted by RD(q,s), first tests if there exists a matched bilexcial dependency between q and s; if yes, it further tests if the head or dependent in the matched dependency is the head of any MMP.

Let $m_{(i)}$ be the $i^{th}$ ranked MMP; let $w_h$, $w_d|q$ and $u_h$, $u_d|s$ be bilexical dependencies from q and s, respectively, where $w_h$ and $u_h$ are the heads and $w_d$ and $u_d$ are the dependents; let EQ(w,u) be a function testing if the question word w and snippet word u are a match. In one embodiment of the present disclosure, EQ(w,u) is true if either w and u are exactly the same, or their morphs are the same, or they head the same entity, or their synset in WordNet overlap. With these notations, RD(q,s) is true if and only if $$EQ(w_h,u_h) \wedge EQ(w_d,u_d) \wedge w_h \in m_{(i)} \wedge w_d \in m_{(j)}$$

is true for some $w_h$, $w_d|q$, for some $u_h$, $u_d|s$ and for some i and j. The actual value of RD(q,s) encodes MMP ranks.

$EQ(w_h,u_h) \wedge EQ(w_d,u_d)$ requires that the question dependency $w_h$, $w_d|q$ and the snippet dependency $u_h$,$u_d|s$ match; $w_h \in m_{(i)} \wedge w_d \in m_{(j)}$ requires that the head word and dependent word are in the $i^{th}$-rank and $j^{th}$ rank MMP, respectively. Therefore, RD(q,s) is a dependency feature enhanced with MMPs. A version of dependency matching feature without MMP ranks may be also used.

FIG. 2 is a flow diagram illustrating a method of predicting an important phrase in natural language query in one embodiment of the present disclosure. At 202, a natural language input is received. The input may be a query or a sentence.

At 204, a parse tree is generated of that comprises nodes of parsed elements of the natural language query. For instance, a parser and a mention detection algorithm may be run on the query. The detected mentions are then used to augment the query parse tree.

At 206, a trained classifier is applied to the parse tree to identify one or more important phrases in the language query.

The examples in Table 1 illustrate the top three MMPs produced by a classifier of the present disclosure on three questions. The phrase "the causes" has much a higher MMP score than the phrase "the concerns" (MMP score of 0.109), even though the words "concerns" has a slightly higher IDF (2.80) than the word "causes" (2.68). In this question, understanding that the word "causes" is important to the meaning of the question would provide more accurate answer, and the MMP classifier captures the importance.

TABLE 1

| Question | Top 3 MMPs | MMP score |
| --- | --- | --- |
| List statistics about changes in the demographics of AIDS. | 1: AIDS | 0.955 |
| | 2: changes | 0.525 |
| | 3: the demographics | 0.349 |
| What are the concerns about the causes of autism? | 1: autism | 0.989 |
| | 2: the causes | 0.422 |
| | 3: the causes of autism | 0.362 |

Figure 5:
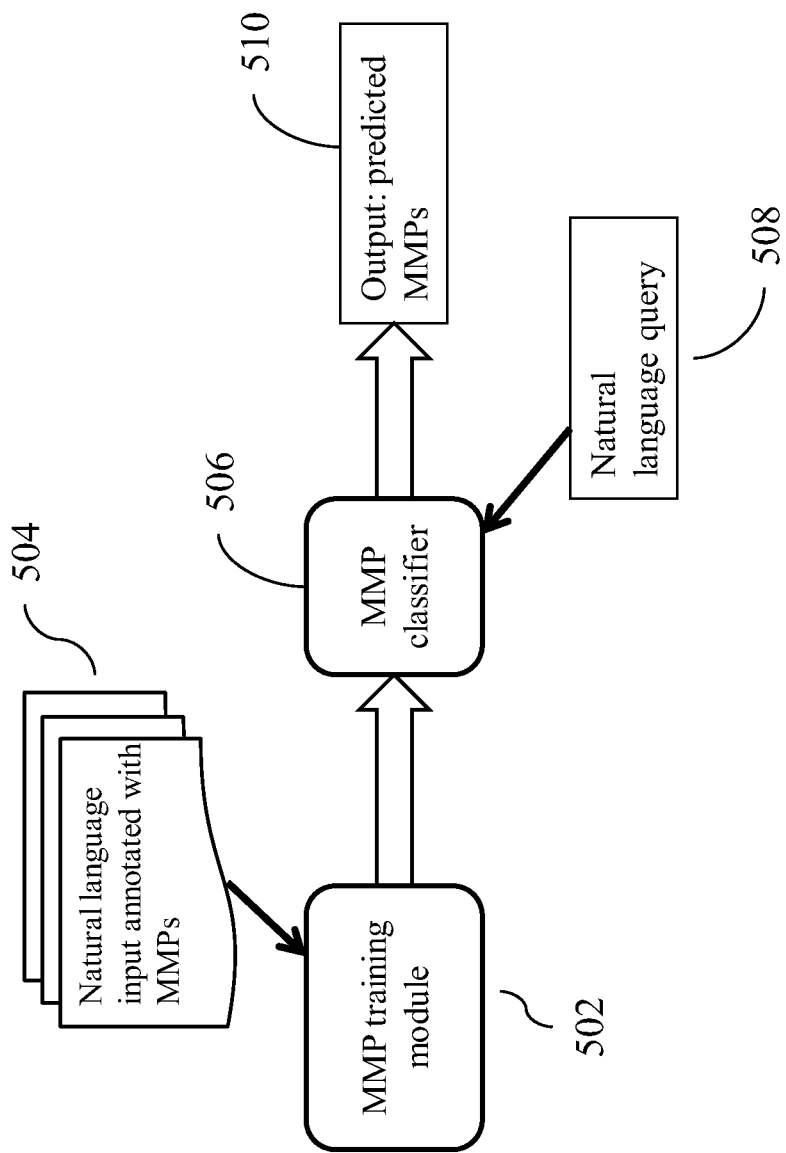
FIG. 5 is a diagram illustrating components of a system in one embodiment of the present disclosure.

FIG. 5 is a diagram illustrating components of a system in one embodiment of the present disclosure. An MMP training module 502 builds an MMP classifier 506 using a set of natural language input annotated with MMPs 504, for example, as discussed above. The MMP classifier 506 then may predict or identify MMPs 510 from an input query 508 previously unknown to it.

Figure 6:
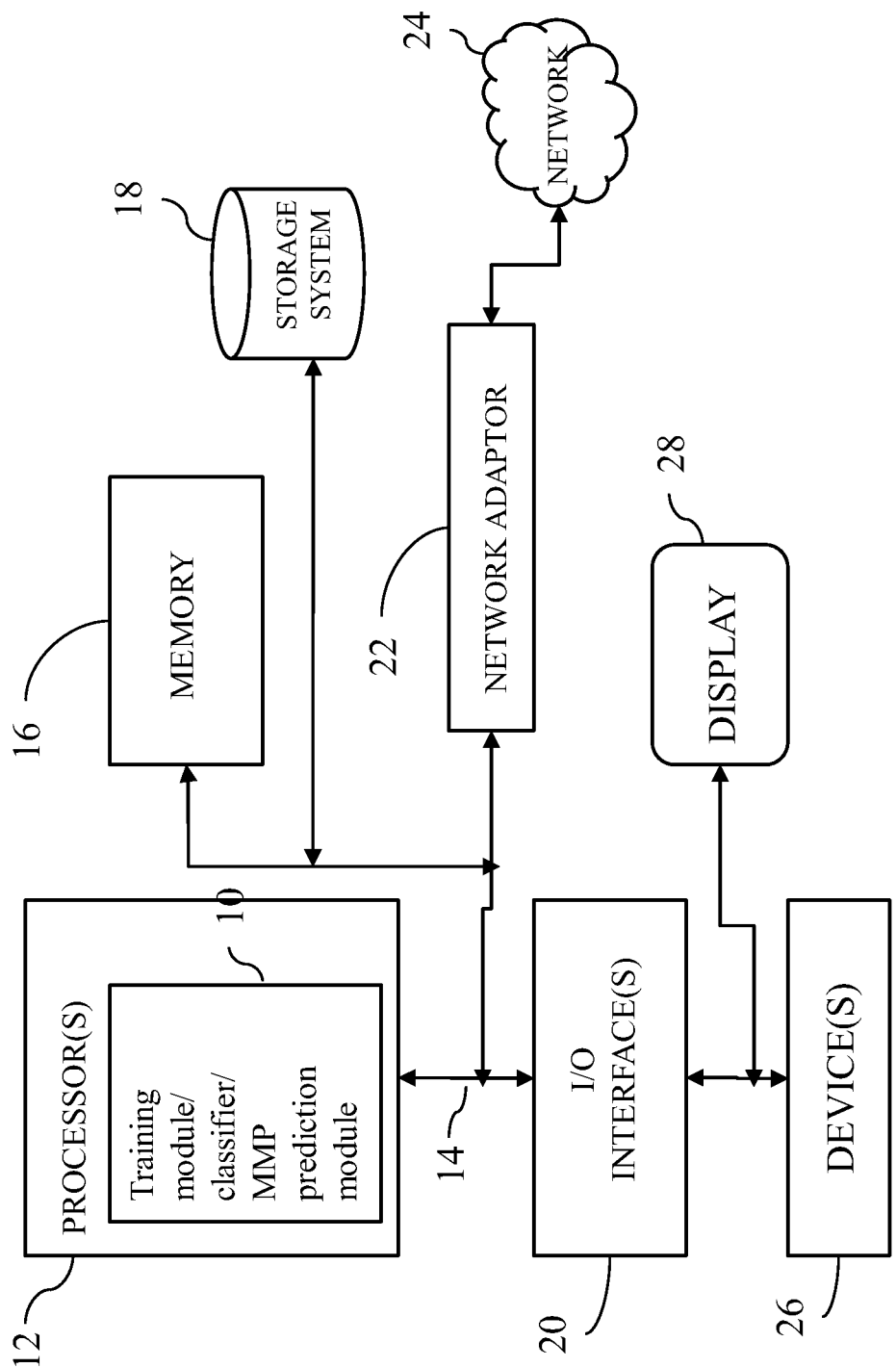
FIG. 6 illustrates a schematic of an example computer or processing system that may implement a model training and prediction system in one embodiment of the present disclosure.

FIG. 6 illustrates a schematic of an example computer or processing system that may implement an MMP training and classifier system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for creating training data for a natural language processing system comprising:
   obtaining natural language input, the natural language input annotated with one or more important phrases;
   generating, by a processor, training instances comprising a syntactic parse tree of nodes representing elements of the natural language input augmented with the annotated important phrases,
   the generating comprising at least creating a syntactic node, which augments the syntactic parse tree output by an information extraction pipeline, for a named mention annotated as an important phrase, responsive to determining that no existing non-terminal nodes in the syntactic parse tree span exactly the named mention; and
   training a classifier based on the generated training instances,
   wherein the natural language processing system executes the classifier in determining a semantic meaning of a given query.

2. The method of claim 1, wherein the training a classifier based on the generated training instances comprises computing a plurality of features associated with the training instances and assigning a score to each of the features.

3. The method of claim 2, wherein the plurality of features comprises one or more of lexical features, syntactic features, semantic features or corpus-based features, or combinations thereof.

4. The method of claim 1, wherein the classifier comprises a statistical classifier.

5. The method of claim 1, wherein the syntactic parse tree is generated by processing the natural language input with the annotated important phrases by an information extraction pipeline comprising syntactic parsing, mention detection and coreference resolution.

6. A method for natural language processing comprising steps of:
   receiving a natural language query;
   creating, by one or more processors, a query syntactic tree for the query;
   using, by one or more of the processors, a trained model comprising a model syntactic tree to predict if a node in the query syntactic tree is important,
   wherein the model syntactic tree comprises a syntactic parse tree of nodes representing syntactic elements of natural language input augmented with annotated important phrases, the model syntactic tree generated by at least creating a syntactic node, which augments the syntactic parse tree created by an information extraction pipeline for a named mention annotated as an important phrase, responsive to determining that no existing non-terminal nodes of the syntactic parse tree span exactly the named mention,
   wherein a semantic meaning of the natural language query is determined based on the model syntactic tree.

7. The method of claim 6, further comprising assigning a score for each node in the query syntactic tree.

8. The method of claim 7, further comprising synthesizing scores for a plurality of nodes.

9. The method of claim 6, further comprising assigning a score for each node in the query syntactic tree and generating bi-lexical dependencies between nodes.

10. A non-transitory computer readable storage medium storing a program of instructions executable by a machine to perform a method of creating training data for a natural language processing system comprising:
    obtaining natural language input, the natural language input annotated with one or more important phrases;
    generating training instances comprising a syntactic parse tree of nodes representing elements of the natural language input augmented with the annotated important phrases,
    the generating comprising at least creating a syntactic node, which augments the syntactic parse tree created by an information extraction pipeline for a named mention annotated as an important phrase, responsive to determining that no existing non-terminal nodes in the syntactic parse tree span exactly the named mention; and
    training a classifier based on the generated training instances,
    wherein the natural language processing system executes the classifier in determining a semantic meaning of a given query.

11. The computer readable storage medium of claim 10, wherein the training a classifier based on the generated training instances comprises computing a plurality of features associated with the training instances and assigning a score to each of the features.

12. The computer readable storage medium of claim 11, wherein the plurality of features comprises one or more of lexical features, syntactic features, semantic features or corpus-based features, or combinations thereof.

13. The computer readable storage medium of claim 10, wherein the classifier comprises a statistical classifier.

14. The computer readable storage medium of claim 10, further comprising predicting one or more potential important phrases in an input query using the trained classifier.

15. The computer readable storage medium of claim 10, wherein the syntactic parse tree is generated by processing the natural language input with the annotated important phrases by an information extraction pipeline comprising syntactic parsing, mention detection and coreference resolution.

16. A system for creating training data for a natural language processing system comprising:
    a processor;
    a training module operable to execute on the processor and further operable to obtain natural language input, the natural language input annotated with one or more important phrases, the training module further operable to generate training instances comprising a syntactic parse tree of nodes representing elements of the natural language input augmented with the annotated important phrases; and
    a classifier built based on the training instances with plurality of features computed for the training instances,
    wherein the training module is operable to generate training instances by at least creating a syntactic node, which augments the syntactic parse tree created by an information extraction pipeline, for a named mention annotated as an important phrase, responsive to determining that no existing non-terminal nodes in the syntactic parse tree span exactly the named mention, wherein a semantic meaning of a given natural language query is determined based on the augmented syntactic parse tree.

17. The system of claim 16, wherein the plurality of features comprises one or more of lexical features, syntactic features, semantic features or corpus-based features, or combinations thereof.

18. The system of claim 16, wherein the syntactic parse tree is generated by processing the natural language input with the annotated important phrases by an information extraction pipeline comprising syntactic parsing, mention detection and coreference resolution, and wherein the classifier is operable to predict one or more potential important phrases in an input query.

* * * * *